United States Patent
Kishimoto et al.

[11] Patent Number: 5,190,420
[45] Date of Patent: Mar. 2, 1993

[54] SOLID END MILL FOR FINISHING THE FACE OR SIDE OF HARD WORK

[75] Inventors: Kiyoshi Kishimoto; Shigeyasu Yodoshi, both of Osaka, Japan

[73] Assignee: Hitachi Tool Kabushiki Kaisha, Tokyo, Japan

[21] Appl. No.: 830,505

[22] Filed: Jan. 31, 1992

Related U.S. Application Data

[63] Continuation of Ser. No. 501,670, Mar. 29, 1990, abandoned.

[30] Foreign Application Priority Data

Jun. 20, 1989 [JP] Japan .................................. 1-157499

[51] Int. Cl.$^5$ .............................................. B26D 1/12
[52] U.S. Cl. ........................................ 407/54; 407/42; 407/63
[58] Field of Search ............... 407/54, 42, 60, 53, 407/56, 61–63; 408/203–205, 199, 230, 229, 227, 715

[56] References Cited

U.S. PATENT DOCUMENTS

| | | | |
|---|---|---|---|
| 1,887,372 | 11/1932 | Emmons | 407/54 X |
| 3,042,994 | 7/1962 | Ruggeberg | 407/54 X |
| 3,672,017 | 6/1972 | Nielson et al. | 407/49 |
| 4,285,618 | 8/1991 | Shanley, Jr. | 407/54 |
| 4,411,563 | 10/1983 | Moon | 407/54 |
| 4,642,003 | 2/1987 | Yoshimura | 407/119 |
| 4,810,136 | 3/1989 | Paige | 407/54 |

Primary Examiner—D. S. Meislin
Attorney, Agent, or Firm—Koda and Androlia

[57] ABSTRACT

An end mill for finishing the face or side of hard work comprising a shank, a plurality of helix cutting edges on the periphery of the end mill, and a cutting edge section perpendicular to the axis of the end mill having a polygonal shape with three or more angles, the cutting edge being the edge formed at each vertex of the polygonal shape along the axis of the end mill and being circumscribed by an imaginary cylinder, and the end mill being characterized in that the helix direction of the cutting edge is identical to the rotational direction of the end mill. The end mill of the present invention is able to cut the face or side of the hard work at a feed rate several times higher than that of conventional end mills. Moreover, the end mill of the present invention assures superior surface roughness of finished work.

7 Claims, 4 Drawing Sheets

1

SOLID END MILL FOR FINISHING THE FACE OR SIDE OF HARD WORK

This is a continuation of application Ser. No. 501,670, filed Mar. 29, 1990, now abandoned.

BACKGROUND OF THE INVENTION

1. Field of the Invention

The present invention relates to an end mill for finishing the face(s) or side(s) of hard work, having a plurality of helix cutting edges on its periphery.

2. Prior Art

An end mill shown in FIG. 2 has been conventionally used as a rotary cutting tool of a machine tool such as a milling machine to cut general-purpose materials such as steel. Generally, such an end mill has sharp cutting edges 2 disposed on an imaginary cylinder and having a helix angle $\theta a$ and a positive rake angle $\theta r$. The end mill also has large flutes 25. This configuration facilitates the edges to cut into work and to allow chips to be discharged smoothly, ensuring very high cutting efficiency. The angles of the cutting edges 2 can be properly formed to have an optimum shape depending on the characteristics of the work. When an end mill with sharp cutting edges is used to cut hard work which cannot be cut efficiently, the edges are worn significantly and are apt to be chipped during cutting. To solve these problems, the specifications of the cutting edges 2 have been improved. More specifically, the strength of the cutting edges 2 are increased by decreasing the rake angle $\theta r$ and the relief angle $\theta c$, and the rigidity of the end mill is also increased by decreasing the depths of the flutes 25, significantly preventing the cutting edges 2 from being worn and chipped.

It is known that an end mill with more cutting edges can have a longer service life, particularly when the end mill is used to cut hard work. Therefore, increasing the number of the cutting edges is also a means for improvement. In addition, the cutting conditions of the end mill, such as the depth of cut, are loosened and the end mill with improved specifications (increased number of cutting edges and other improvements in the performance of the edges) is used, when the end mill cannot efficiently cut the hard work.

To efficiently finish the face or side of the hard work, end mills must be made of materials with sufficient hardness and strength suited for cutting the hard work. High-speed steel and cemented carbide are generally used as the materials of end mills. When cutting the hard work, end mills made of cemented carbide and coated with hard substance such as TiN are used widely. Even in this case, however, such end mills with cutting edges having conventional shapes cannot cut work harder than HRC55.

The demand for finishing the face or side of hard work is increasing in many industrial fields. However, it is almost impossible to cut hard work such as hardened tool steel having a hardness of HRC60, no matter how the specifications such as the rake angle, relief angle and the number of the cutting edges of a conventional end mill are modified, because the modified specification values are not appropriate to practical use. This problem cannot be solved by changing cutting conditions. To cope with this situation, grinding and electrical discharge machining methods have been used. However, these methods are slow in cutting speed, resulting in low cutting efficiency.

Very hard materials such as ceramics, CBN (Cubic Boron Nitride) and diamond are used as cutting tool materials. Although these materials are extremely hard, they are relatively fragile and liable to be chipped during end mill cutting because cutting is performed intermittently. In addition, they cannot be formed into desired shapes due to low machinability. As a result, they are used only for limited applications, such as slight amounts of cutting.

SUMMARY OF THE INVENTION

Accordingly, it is an object of the present invention to provide an easy-to-produce end mill ideally suited for finishing the face or side of hard work made of such as hardened materials and being capable of solving the above-mentioned problems.

To achieve the objects of the present invention, the cutting edge section perpendicular to the axis of the end mill has a polygonal shape with three or more angles and the edge formed at each vertex of the polygonal shape along the axis of the end mill forms a cutting edge having a helix shape. The direction of the cutting edge of the helix is made identical to the rotational direction of the end mill.

The sides of the polygonal section can be concaved. The cutting angle of the cutting edge formed at each edge of the polygon is set to between 90° to 130° in the section perpendicular to the axis of the end mill.

In addition, at the end surface of the end mill, a plurality of bottom edges are disposed from the vertexes of the polygon to the center of the axis. The number of the bottom edges is set as a divider of the number of the angles of the polygon, that is, the quotient obtained by dividing the number of the angles of the polygon by the number of the bottom edges is an integer.

The end mill made of cemented carbide is further coated with hard substance such as TiN. This hardening of the end mill is combined with the above-mentioned shapes of the cutting edges to make the cutting of the hard work possible.

The present invention is detailed below referring to the accompanying drawings and examples.

BRIEF DESCRIPTION OF THE DRAWINGS

FIG. 1 (A) is a simplified front view of the first example illustrating the polygonal shape and the bottom cutting edges; FIG. 1 (B) is a side view of the first example; FIG. 1 (C) is a top view of the first example;

FIG. 2 (A) is a front view of the example of the conventional end mill; FIG. 2 (B) is a side view of the example of the conventional end mill;

FIG. 3 (A) is a simplified front view of the second example illustrating the polygonal shape and the bottom cutting edges; FIG. 3 (B) is a side view of the second example;

The purposes of the present invention are the same as those of the Japanese Utility Model Application No. 9852/1989 that was applied for by the same applicant of the present invention. The present invention is intended to upgrade the major features of the Application. FIG. 1 illustrates an end mill which is rotated clockwise as obviously indicated by the direction of the bottom edge 13. The section perpendicular to the axis of the end mill is hexagonal and the cutting edge of the end mill has a right-hand helix angle $\theta a$. In the case of the hexagonal section, six peripheral cutting edges are formed. The cutting edge has a rake angle $\theta r$ of $-60°$ and a relief angle $\theta c$ of 30° in the section perpendicular to the axis as shown in the sectional view of FIG. 4. The cutting angle $\theta t$ of the end mill is thus 120°. With these specifications, the end mill of the present invention is capable of having the cutting strength and rigidity suited for cutting of the hard work as high as HRC60. The end mill of the present invention can have more cutting edges than the conventional end mills even when the diameter of the end mill is small. Chip pockets are indispensable to end mills. The chip pockets of the end mill of the present invention are formed at the areas enclosed by the cylinder that circumscribes the edges of the polygonal section, i.e., the cutting edges 10 and the surfaces formed by the sides of the polygonal section. It is known that these chip pocket areas are enough to treat chips, because the amount of chips is limited in the case of finish cutting. The cutting edge 10 has the right-hand helix angle $\theta a$ to relieve the impact caused at the time of cutting and to smoothly cut the hard work, thereby ensuring finish cutting of the hard work, even though the cutting angle $\theta t$ of the end mill is large.

Figure 5:
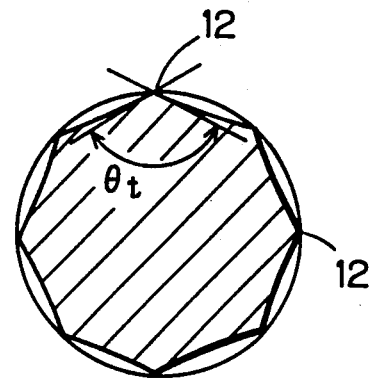
FIG. 5 illustrates the concaved sides of the polygonal section of the end mill of the present invention.

It is desirable to increase the number of cutting edges, that is, to use polygon like shapes with more vertexes when cutting harder work. Particularly when the diameter of the end mill is larger, the number of the cutting edges should be increased. If the polygon like shape has eight or more vertexes, however, the vertex angle of the polygon like shape is too large to properly function as the cutting angle $\theta t$. To solve this problem, each side of the polygon like shape is concaved to obtain the desired cutting angle ranging between 90° and 130° as illustrated by the octagonal-shape in FIG. 5.

Figure 6A:
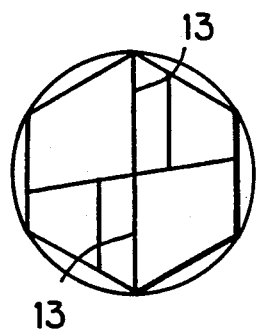
FIGS. 6 (A), (B) and (C) are simplified front views which illustrate the arrangements of the bottom edges for the regular hexagonal section of a third example of the present invention, and FIGS. 7 and 8 compare the performance of the end mills of the present and that of conventional end mills.
Figure 6B:
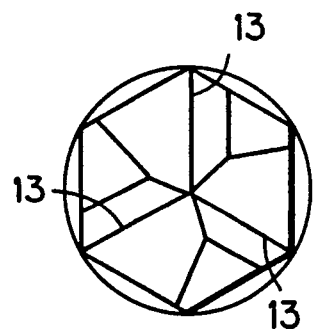
Figure 6C:
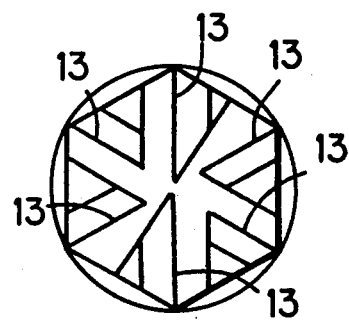

A plurality of the bottom edges 13, which are indispensable to end mills, are provided for the end mill of the present invention from the vertexes of the polygon like shape to the center of the axis. In addition, the number of the bottom edges is set as a divider of the number of the angles of the polygon like shape or the quotient obtained by dividing the number of the angles of the polygon by the number of the bottom edges is an integer. This arrangement makes the bottom edges well-balanced and stable during cutting. When the polygon like shape is a square, for example, the number of the bottom edges is two or four. When the polygon like shape is a hexagon, the number of the bottom edges is two, three or six. FIG. 6 illustrates the arrangements of the bottom edges 13 (indicated by black solid areas for easy visual recognition) selectable when the polygon like shape is a hexagon.

The end mill of the present invention is made of cemented carbide coated with hard substance. This hardening of the end mill is combined with the above-mentioned shapes of the cutting edges to make the cutting of the hard work possible. The large negative rake angle of the end mill of the present invention prevents the coating of the end mill from being peeled during cutting. (Peeling is the most undesirable phenomenon of the coating.)

EXAMPLES

Figure 1A:
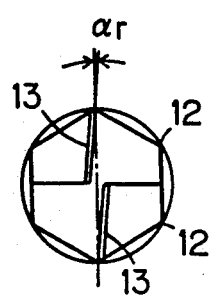
FIGS. 1 (A), 1 (B) and 1 (C) illustrate a first example of the present invention.
Figure 1B:
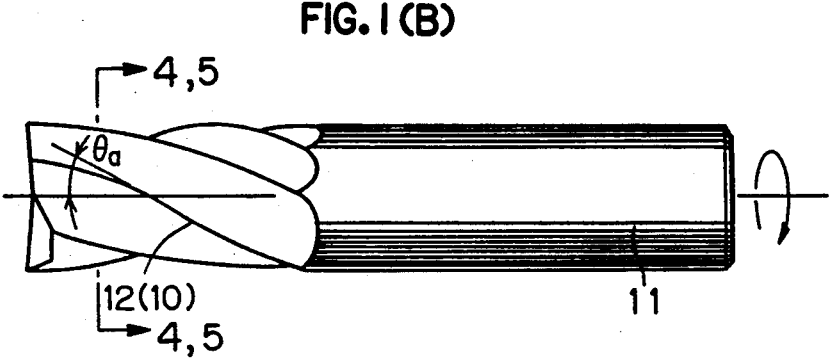
Figure 1C:
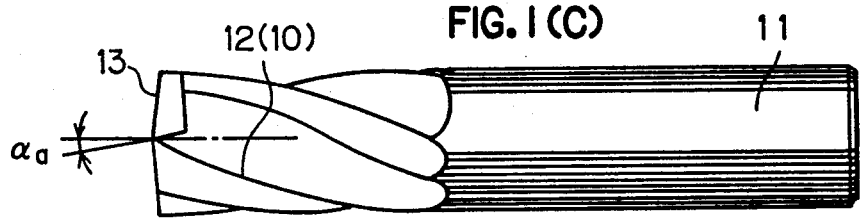
Figure 2A:
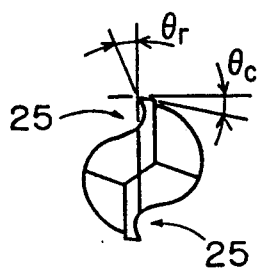
FIG. 2 (A) and 2 (B) illustrate an example of a conventional end mill.
Figure 2B:
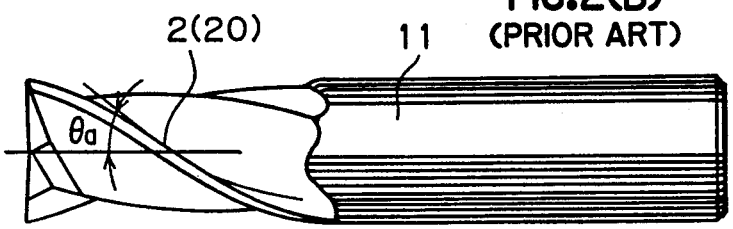
Figure 7:
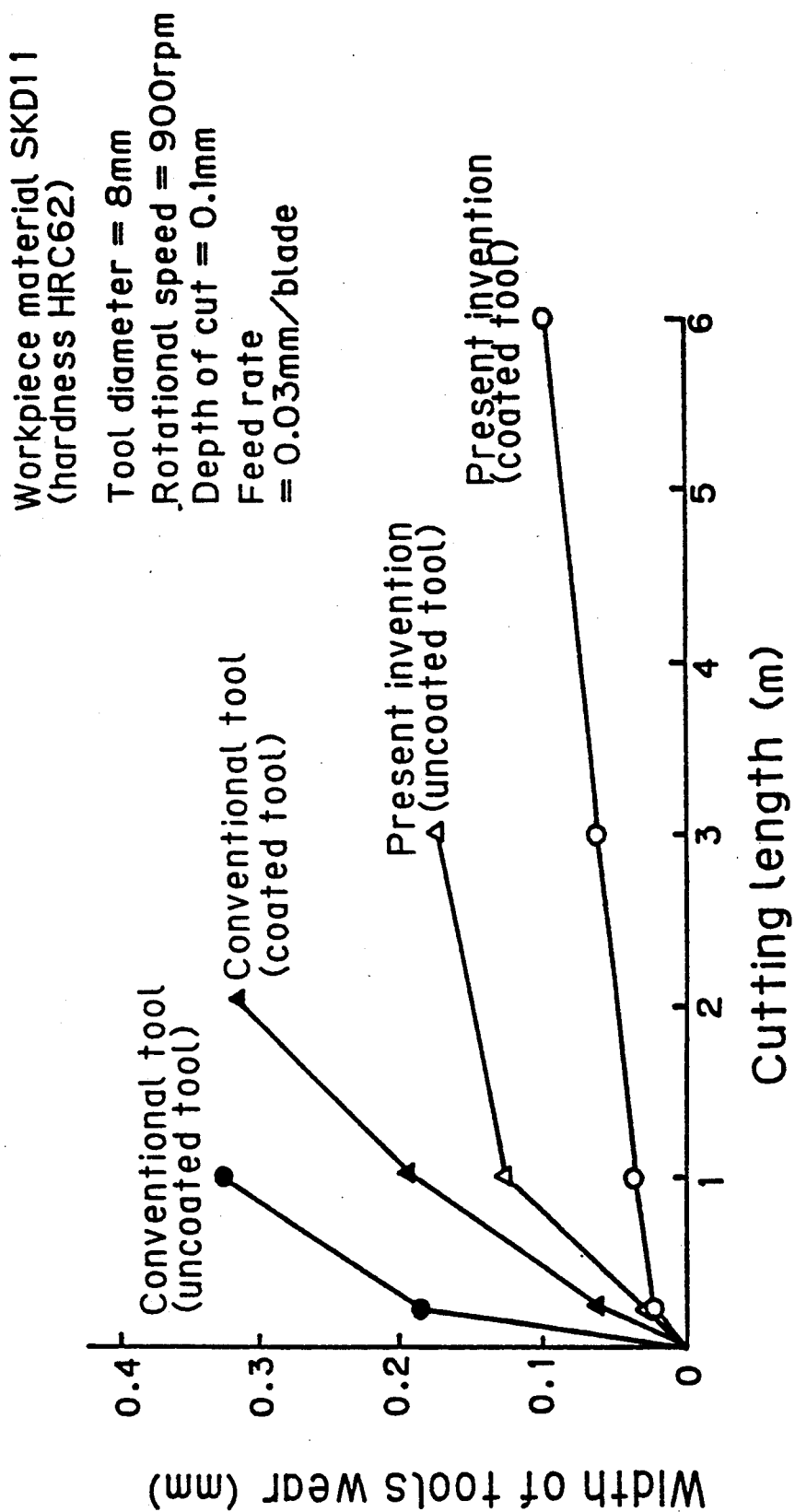
Figure 8:
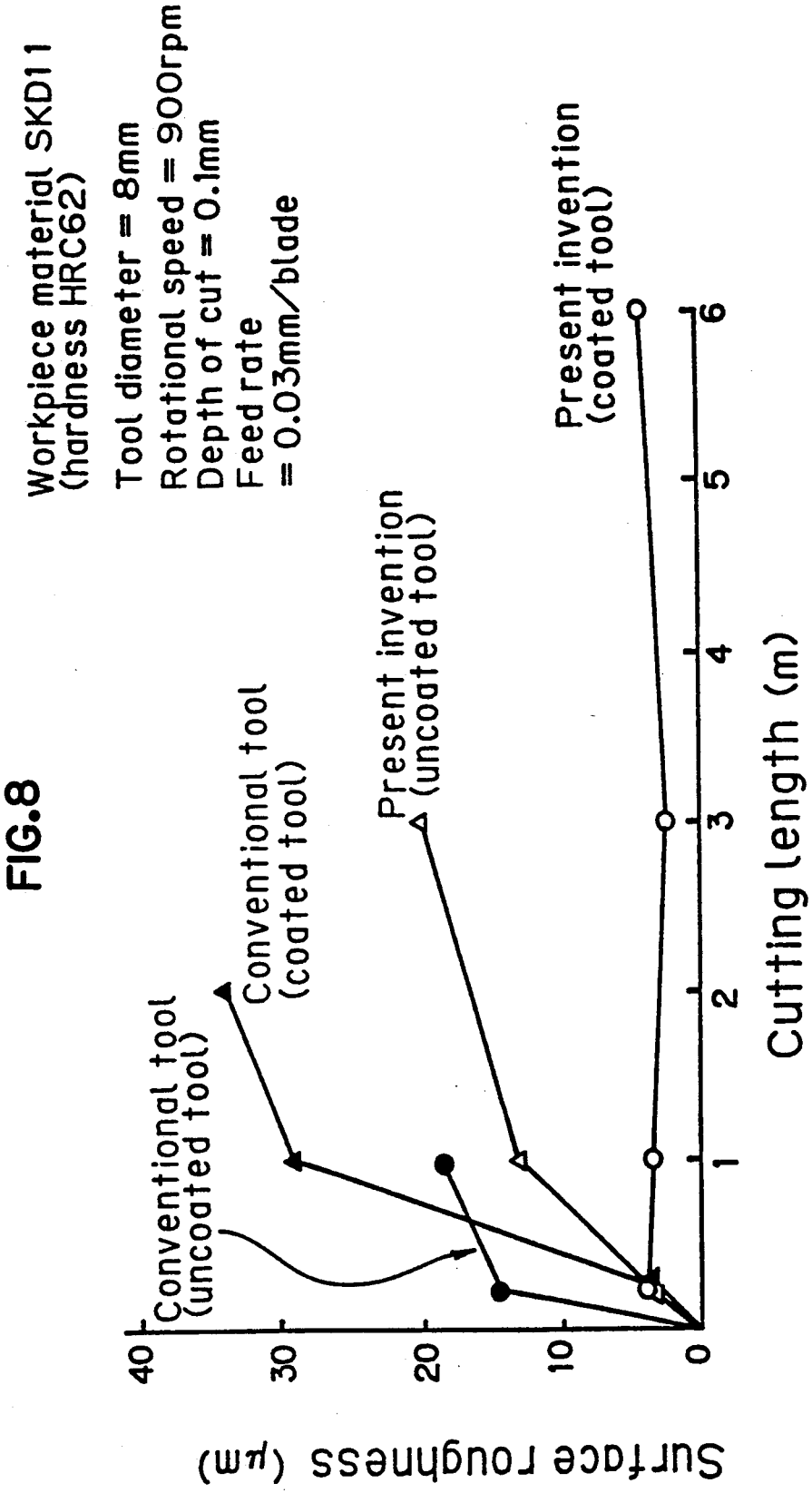

FIG. 1 illustrates a first example of the end mill of the present invention which rotates clockwise. On the periphery of the shank 11 of the end mill, the edge formed along the axis of the end mill at each vertex 12 of the regular hexagonal section perpendicular to the axis forms a cutting edge 10 with a right-helix angle of 30°. The two bottom edges 13 disposed on the end surface of the shank 11 has a rake angle $\alpha r$ of $-20°$ in the radial direction and a rake angle $\alpha a$ of $-5°$ in the axial direction. The end mill is 8 mm in diameter and 60 mm in overall length. The length of its cutting section is 20 mm. The end mill is made of cemented carbide and coated with TiN. By finish cutting the cold metal mold made of alloy steel heat-treated to have a hardness of HRC62, the finish cutting performance of the uncoated and coated end mills of this invention was compared with that of uncoated and coated conventional end mills made of cemented carbide as described below. The dimensions of these conventional end mills, illustrated in FIG. 2, are the same as those of the end mills of the present invention. The depth of cut was 0.1 mm in the radial direction and dry cutting was performed. FIGS. 7 and 8 illustrate the results of the comparison. According to FIGS. 7 and 8, the durability of the end mills of the present invention is three or more times that of the conventional end mills. It is obvious that the surface roughness obtained by the end mills of the present invention is superior to that obtained by the conventional end mills. The uncoated conventional end mill was significantly chipped when the cutting length of the end mill reached only 0.25 m. Cutting had to be stopped when the cutting length reached 1 m. The coated conventional end mill was able to withstand a cutting length of only 2 m. The coated end mill of the present invention was not chipped and was able to be used further when the cutting length reached 6 m, even though the feed rate of the end mill was three times that of the conventional end mills. The surface roughness obtained by using the uncoated conventional end mill made of cemented carbide was about 20 $\mu$m Rmax because the end mill was chipped. The surface roughness obtained by using the coated conventional end mill made of cemented carbide was about 30 $\mu$m Rmax or more because the coating was peeled. The surface roughness obtained by using the coated cemented carbide end mill of the present invention was as low as about 5 $\mu$m Rmax. This indicates that the edge shape of the end mill of the present invention is well matched with its coating.

Figure 3A:
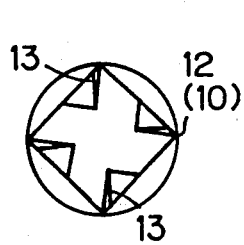
FIGS. 3 (A) and 3 (B) illustrate a second example of the present invention.
Figure 3B:
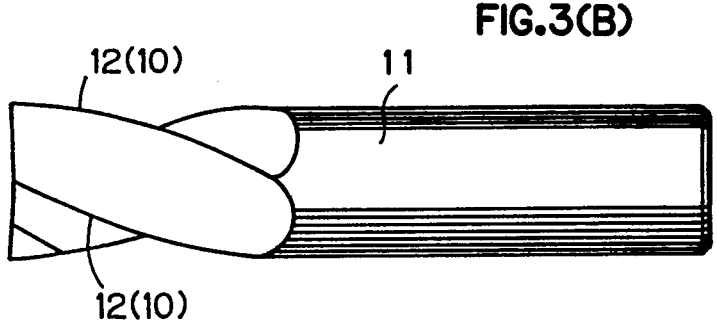
Figure 4:
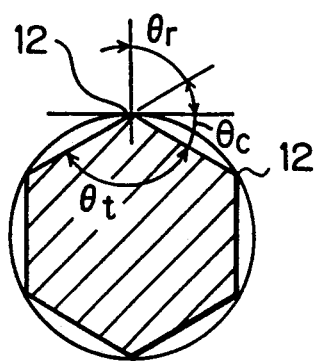
FIG. 4 illustrates the rake and relief angles of the peripheral cutting edges for the regular hexagonal section perpendicular to the axis of the end mill of the present invention.

The number of the angles of the polygon and the number of the bottom edges can be determined properly by considering the hardness of the work, tool material and tool diameter. The helix angle of the cutting edges and the rake angle of the bottom edges can also be selected within the predetermined ranges. FIG. 3 illustrates an example of the end mill of the present invention with a square section. The number of the bottom edges of this example is four. Like reference characters designate the corresponding sections in the accompanying drawings. A tapered slot end mill having a polygonal shape is an example of an end mill similar to this invention. The polygonal shape is utilized to increase the rigidity of the end mill that has a small diameter and a long cutting section. Unlike the end mill of the present invention, the tapered slot end mill has a tapered cutting section and is used to cut only deep slots.

As described above, the end mill of the present invention has helix cutting edges of a polygonal section perpendicular to its axis. This increases the number of the cutting edges, the strength of the cutting edges and the rigidity of the end mill, thus significantly preventing the cutting edges from being worn and chipped. The helix angle formed in the rotational direction of the end mill relieves the impact generated during cutting. As a result, the end mill of the present invention is able to cut the face or side of hard work at a feed rate several times higher than that of the conventional end mills. Moreover, the end mill of the present invention assures superior surface roughness of finished work. The cutting method using the end mill of the present invention made of conventional tool materials, i.e., cemented carbide and coated hard substance, has thus become comparable well with grinding and electrical discharge machining methods which are generally used to cut hard work.

Even when the polygon has many angles, the above-mentioned effects can be obtained by concaving each side of the polygon.

We claim:

1. A solid end mill for finishing the face or side of hard work comprising a shank, a plurality of helix cutting edges on the periphery of said end mill, and a cross-section of the end mill which is perpendicular to a longitudinal axis of said end mill is of a polygonal like shape in cross-section with three or more angles, said polygonal like shape having adjacent sides of said polygonal like shape forming vertexes, said polygonal like shape selected from the group consisting of a regular hexagonal and a regular octagonal shape, said cutting edges being formed at each vertex of said polygonal like shape along the longitudinal axis of said end mill and being circumscribed by an imaginary cylinder, and said end mill further being characterized in that a direction of the helix of said cutting edges about said longitudinal axis of said end mill is identical to the rotational direction of said end mill.

2. An end mill according to claim 1, wherein each side of said polygonal like cross-section is concaved.

3. An end mill according to claim 1 or 2, wherein a cutting angle of one of said cutting edges formed by two side surfaces of one of said vertices of said polygonal like shape is set to between 90° and 130° in the section perpendicular to said axis.

4. An end mill according to claim 1, wherein said polygonal like shape is a hexagon having six cutting edges with one provided at each vertex and two bottom edges provided at a cutting end of said end mill, said cutting edges have a right-helix angle of 30° and each of said two bottom edges has a rake angle of −20° in the radial direction and a rake angle of −5° in the axial direction.

5. An end mill according to claim 4, wherein at a cutting end surface of said end mill, a plurality of said bottom edges are disposed from the vertexes of said polygonal like shape to said axis of said end mill and the number of said bottom edges is set as a divider of the number of the angles of said polygonal like shape, with the number of said bottom edges being an integer.

6. An end mill according to claim 1, 2 or 4, wherein said end mill is made of cemented carbide and coated with hard substance.

7. An end mill according to claim 4, wherein at a cutting end surface of said end mill, a plurality of said bottom edges are disposed from the vertexes of said polygonal like shape to said axis of said end mill and the number of said bottom edges is set as a quotient obtained by dividing the number of angles of said polygonal like shape by the number of said bottom edges, with the number of said bottom edges being an integer.

* * * * *